United States Patent
Tóth et al.

(10) Patent No.: US 8,941,292 B2
(45) Date of Patent: Jan. 27, 2015

(54) LAMP WITH ENHANCED CHROMA AND COLOR PREFERENCE

(75) Inventors: Katalin Tóth, Pomaz (HU); István Károly Deme, Budapest (HU); Attila Kulcsár, Budapest (HU); Gáza István Szeghy, Dunakeszi (HU)

(73) Assignee: General Electric Company, Schenectady, NY (US)

( * ) Notice: Subject to any disclaimer, the term of this patent is extended or adjusted under 35 U.S.C. 154(b) by 738 days.

(21) Appl. No.: 12/911,273

(22) Filed: Oct. 25, 2010

(65) Prior Publication Data

US 2012/0098411 A1   Apr. 26, 2012

(51) Int. Cl.
| | |
|---|---|
| *H01J 1/63* | (2006.01) |
| *H01J 61/44* | (2006.01) |
| *C09K 11/77* | (2006.01) |
| *H01J 61/16* | (2006.01) |
| *H01J 61/70* | (2006.01) |

(52) U.S. Cl.
CPC ............. *H01J 61/44* (2013.01); *C09K 11/7734* (2013.01); *C09K 11/7777* (2013.01); *C09K 11/7787* (2013.01); *H01J 61/16* (2013.01); *H01J 61/70* (2013.01)
USPC ........................................................ 313/487

(58) Field of Classification Search
None
See application file for complete search history.

(56) References Cited

U.S. PATENT DOCUMENTS

| | | |
|---|---|---|
| 6,525,460 B1 | 2/2003 | Soules |
| 6,867,536 B2 | 3/2005 | Srivastava et al. |
| 7,119,488 B2 | 10/2006 | Soules et al. |
| 7,138,757 B2 | 11/2006 | Toth, et el. |
| 7,391,148 B1 | 6/2008 | Setlur et al. |
| 7,670,507 B2 | 3/2010 | Konrad et al. |
| 2008/0265207 A1 | 10/2008 | Konrad et al. |
| 2009/0079324 A1 | 3/2009 | Deme et al. |
| 2009/0102348 A1 | 4/2009 | Beers et al. |
| 2009/0102391 A1 | 4/2009 | Beers et al. |
| 2009/0122530 A1 | 5/2009 | Beers et al. |
| 2009/0134769 A1 | 5/2009 | Cavallaro et al. |
| 2009/0309482 A1 | 12/2009 | Srivastava |
| 2010/0096998 A1 | 4/2010 | Beers |

FOREIGN PATENT DOCUMENTS

GB         2408382 A        5/2005

OTHER PUBLICATIONS

Davis and Ohno, "Color Quality Scale", Optical Engineering, vol. 49, #3, p. 033602 (Mar. 2010).

(Continued)

*Primary Examiner* — Britt D Hanley
*Assistant Examiner* — Brenitra M Lee
(74) *Attorney, Agent, or Firm* — GE Global Patent Operation; Peter T. DiMauro

(57) ABSTRACT

Disclosed herein are low pressure discharge lamps having enhanced chroma and color preference. improved color quality scale, especially at elevated color temperatures, is provided. The light generated by the light-emitting elements of the lamp, when the lamp is energized, has Color Preference Scale values, as well as delta chroma values for fifteen color samples of the Color Quality Scale, within select parameters.

18 Claims, 5 Drawing Sheets

(56) References Cited

OTHER PUBLICATIONS

Zukauskas, Vaicekauskas and Shur, Colour-rendition properties of solid-state lamps, Journal of Physics D: Appl. Phys., Published Aug. 19, 2010, vol. 43, p. 354006, (http://iopscience.iop.org/0022-3727/43/35/354006).

EP Search Report and Opinion dated Jan. 11, 2012 from corresponding Application No. EP11185388.3.

Hunt "Light and Dark Adaptation and the Perception of Color", Journal of the Optical Society of America, vol. 42 No. 3, Mar. 1952, pp. 190-199.

Hashimoto et al., "New Method for Specifying Color-Rendering Properties of Light Sources Based on Feeling of Contrast", Color Research and Application, vol. 32, No. 5, pp. 361-371, Oct. 2007.

Ohno, "Spectral Design Considerations for White LED Color Rendering", Optical Engineering, vol. 44, No. 11, Nov. 2005, 9 pages.

Judd, "A Flattery Index for Artificial Illuminants", Illuminating Engineering Journal, vol. No. 62, pp. 593-598, Oct. 1967.

Thornton, "A Validation of the Color-Preference Index", Journal of the Illuminating Engineering Society, vol. 4, No. 1, pp. 48-52, Oct. 1974.

Mahler et al., "Testing LED Lighting for Colour Discrimination and Colour Rendering", Color Research & Application, vol. 34, No. 1, pp. 8-17, Feb. 2009.

US 8,941,292 B2

LAMP WITH ENHANCED CHROMA AND COLOR PREFERENCE

FIELD OF THE INVENTION

The present invention generally relates to low pressure discharge lamps, and in particular some embodiments herein relate to low pressure discharge lamps that exhibit improved color quality.

BACKGROUND

Low-pressure discharge (e.g., fluorescent) lighting systems are widely employed illumination systems for general, energy-efficient use. The quality of object color under illumination by such system is an important aspect of the value of such light source. In general, the quality of object color has been described in terms of color rendering, which is a measure of the degree to which the psycho-physical colors of objects illuminated by a light source conform to those of a reference illuminant for specified conditions.

It has been generally known from basic research that a light source which has enhanced chroma (chromatic saturation) may serve to increase the visual clarity of illuminated objects, the feeling of contrast, and the brightness as perceived by viewers. It has also been generally known that people may have a preference for a slightly enhanced chroma of illuminated objects. However, it has heretofore been difficult to provide an enhanced (increased) chroma in an even or symmetrical manner. An asymmetrically increased chroma can lead to diminished color discrimination efficiency. Furthermore, if one were to employ some usual methods of maximizing color rendering (e.g., the Color Rendering Index, CRI), the result may be to penalize any change in color relative to the reference light source. Also, if one were to arbitrarily increase chroma to satisfy viewer preferences, it may result in a lamp having an insufficiently high CRI value to suit burgeoning global regulations.

Consumers have found that incandescent bulbs sold as REVEAL® by the General Electric Company to be quite appealing. One recent energy-efficient type of lamp provides fluorescent, solid-state diode, and fluorescent-solid state hybrid systems for providing the appealing color quality of REVEAL® incandescent bulbs. These have been described in patent publications, in e.g. United States Patent Publications 2009/0102348; 2009/0102391; 2009/0122530; and 2010/0096998, all of which are assigned to the same assignee as the present disclosure. However, these lamps may not always provide a balanced chroma increase.

It may be desirable to provide lamps having further improved color rendering properties, especially with respect to rendering of saturated colors.

BRIEF SUMMARY OF THE INVENTION

One embodiment of the present invention is directed to a low pressure discharge lamp having evenly enhanced chroma and improved color preference. The lamp, when energized, has a total light emission exhibiting a correlated color temperature (CCT) of between about 2000 kelvin to about 4500 kelvin. The lamp comprises, a light-transmissive envelope, a fill gas sealed inside the envelope, and a phosphor composition having a light emission when energized. When the lamp is energized the lamp has a total light emission which: (a) has a color point below the Planckian locus in the CIE standard chromaticity diagram; (b) exhibits delta chroma values for each of VS1 through VS15 of from about −10.0 to about +12.5, the delta chroma values measured in the CIE LAB space; and (c) exhibits a Color Preference Scale $Q_p$ value of at least about 88.

A further embodiment of the present invention is directed to a low pressure discharge lamp having evenly enhanced chroma and improved color preference, which lamp when energized has a total light emission exhibiting a correlated color temperature of between about 2000 kelvin to about 4500 kelvin. The lamp comprises, a light-transmissive envelope, a fill gas sealed inside the envelope, and a phosphor composition having a light emission when energized. When the lamp is energized the lamp has a total light emission which: (a) exhibits delta chroma values for each of VS1 through VS15 of from about −10.0 to about +12.5, the delta chroma values measured in the CIE LAB space; and (b) exhibits a Color Preference Scale $Q_p$ value of at least about 88. The phosphor composition comprises, a first red phosphor having a peak emission in the range of from about 590 to about 630 nm, wherein the first red phosphor is present in the composition in an amount between about 48 wt % to about 75 wt %; and optionally a second red phosphor having a peak emission in the range of from about 590 to about 670 nm, wherein the second red phosphor is present in the composition in an amount between 0 wt % to about 20 wt %; a green phosphor having a peak emission in the range of from about 500 to about 570 nm, wherein the green phosphor is present in the composition in an amount between about 12 wt % and about 24 wt %; and a blue phosphor having a peak emission in the range of from about 450 to about 500 nm, wherein the blue phosphor is present in the composition in an amount between about 5 wt % to about 30 wt %; wherein each phosphor in the composition may emit one or more colors.

A yet further embodiment of the present invention is directed to a fluorescent lamp having evenly enhanced chroma and improved color preference, the lamp comprising a phosphor layer. The layer comprises a phosphor composition consisting essentially of the following three phosphors: a europium-doped yttrium oxide red phosphor present in an amount of about 48 to about 75 weight percent; a cerium- and terbium-doped green phosphor present in an amount of about 12 to about 24 weight percent; and a europium-doped strontium aluminate blue phosphor present in an amount of about 5 to about 30 weight percent.

An even further embodiment of the present invention is directed to a fluorescent lamp having evenly enhanced chroma and improved color preference, the lamp comprising a phosphor layer. The layer comprises a phosphor composition consisting essentially of the following four phosphors: a europium-doped yttrium oxide red phosphor present in an amount of about 48 to about 75 weight percent; a cerium- and terbium-doped green phosphor present in an amount of about 12 to about 24 weight percent; a europium-doped strontium aluminate blue phosphor present in an amount of about 5 to about 30 weight percent; and a metal pentaborate, doped with at least one of cerium and manganese, red phosphor present in an amount of greater than 0 weight percent to about 20 weight percent.

Other features and advantages of this invention will be better appreciated from the following detailed description.

BRIEF DESCRIPTION OF THE DRAWINGS

Embodiments of the invention will now be described in greater detail with reference to the accompanying Figures.

DETAILED DESCRIPTION

Figure 1:
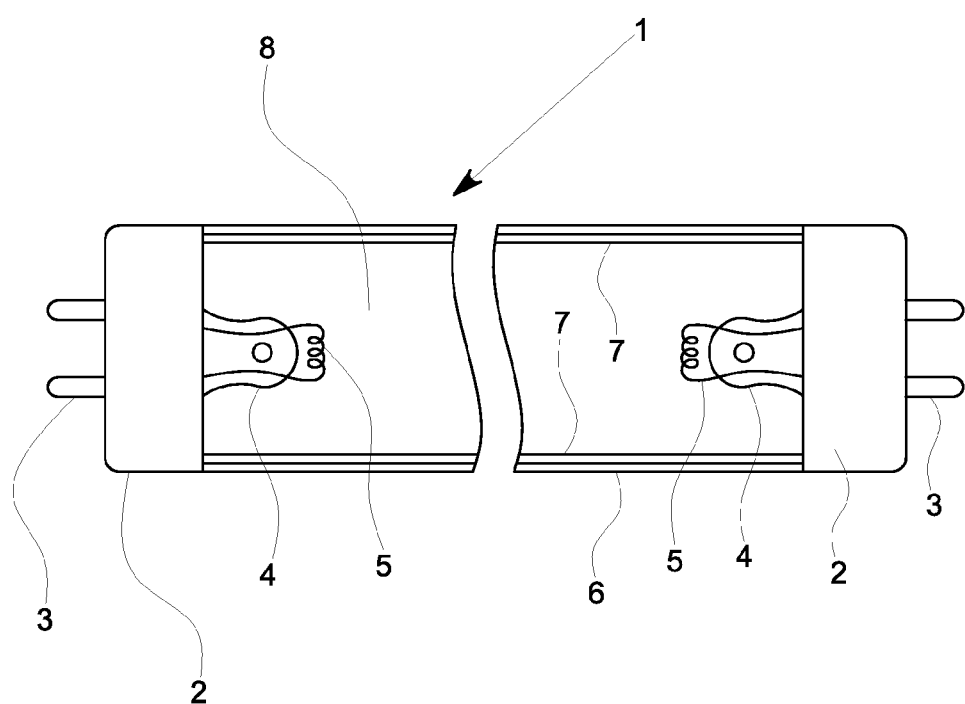
FIG. 1 shows diagrammatically, and partially in section, a fluorescent lamp according to embodiments of the present disclosure.

In accordance with embodiments, the present invention generally relates to low-pressure discharge lamps, such as fluorescent lamps. It is contemplated to be within the scope of the disclosure to make and use the lamps disclosed herein, in a wide variety of types, including mercury fluorescent lamps, low dose mercury, very high output fluorescent, and mercury free low-pressure fluorescent lamps. The lamp may include electrodes or may be electrodeless. The lamp may be linear, but any size shape or cross section may be used. It may be any of the different types of fluorescent lamps, such as T5, T8, T12, 17 W, 20 W, 25 W, 32 W, 40 W, 54 W, 56 W, 59 W, 70 W, linear, circular, 2D, twin tube or U-shaped fluorescent lamps. They may be high-efficiency or high-output fluorescent lamps. For example, embodiments of the present invention include lamps that are curvilinear in shape, as well as compact fluorescent lamps as are generally familiar to those having ordinary skill in the art. Generally, the low-pressure discharge lamps will comprise at least one light-transmissive envelope, which can be made of a vitreous (e.g., glass) material and/or ceramic, or any suitable material which allows for the transmission of at least some visible light. These lamps will comprise a fill gas composition capable of sustaining an electric discharge, which is sealed inside the at least one light-transmissive envelope.

Generally, low pressure discharge lamps in accordance with embodiments of the invention will have at least one phosphor composition carried on said light-transmissive envelope, e.g., on an inner surface of said light-transmissive envelope. As is generally well known, phosphor compositions convert the electromagnetic radiation emanating from the discharge into desired wavelengths, usually of lower energy. In embodiments where the lamp has multiple envelopes, the light-transmissive envelope upon which is disposed a phosphor composition may be an inner envelope.

The term "total light emission" refers to the combined light emitted from a lamp having one or more light-emitting elements (e.g., individual phosphors). If a lamp contains more than one light emitting element, the combination of the light from all the elements will also be an example of what may constitute a total light emission. For example, a lamp may be a fluorescent lamp having a phosphor layer with one or more phosphors, which phosphors are excited to convert ultraviolet light from a low-pressure vapor discharge. In this case, the total light emission is the combined light emitted by the excited phosphors (and any light from the discharge which escapes). Total light emission may also refer to the combined light emitted from a lamp having one or more light-emitting elements as defined above, and further including (e.g., supplemented by) light from other types of elements (e.g., LED and/or OLED).

In accordance with embodiments of the invention, lamps are provided which have a total light emission which may have a generally increased chroma while simultaneously having a sufficiently high CRI value. The Color Rendering Index (CRI) is a traditional standard for measuring how well the spectral distribution of a light source compares with that of a blackbody source. It is often desirable to provide a lighting source that generates white light having a relatively high CRI value Ra, so that objects illuminated by the lighting may appear similar to those illuminated by the appropriate reference light source. The first eight Color Rendering Indices (namely, $R_i$ where i is 1-8) are combined by a simple averaging to obtain the General Color Rendering Index, which is termed Ra (or sometimes, Ra8 or $R_{a8}$). These first eight Color Rendering Indices all are at low to medium chromatic saturation.

However, since none of the eight reflective samples used in the computation of Ra are highly saturated, color rendering of saturated colors can be very poor even when the Ra value is high. This makes it possible for a lamp to score quite well on the CRI, even when it renders one or two colors very poorly. Furthermore, the very definition of Color Rendering in the CRI is limiting. Color rendering is a measure of only the fidelity of object colors under the source of interest, and any deviation of object color appearance from under a blackbody or daylight illuminant is considered bad. Because of this constraint, all shifts in perceived object hue, saturation, and lightness result in equal decrements of the Ra score. In fact, CRI may penalize lamps for showing increases in object chromatic saturation compared to reference lights. The CRI may penalize lamps for shifts in hue, chroma (chromatic saturation), and lightness, in any direction, of the reflective samples under the test source (compared to under the reference source).

In practical application, however, increases in the chromatic saturation of reflective objects (observed when certain sources illuminate certain surfaces), may be considered desirable. Increases in saturation may yield better visual clarity and enhance perceived brightness.

The Color Quality Scale (CQS) is a newer color rendering system, currently being developed at the National Institute of Standards and Technology (NIST), which may address some of these deficiencies. Unlike the CRI, however, the CQS is meant to measure overall light quality, not simply color fidelity. The CQS system uses an overall $Q_a$ value that incorporates the color appearance of a total of fifteen Munsell color samples, all of which have relatively high chromatic saturation and are substantially evenly distributed in the color space. The $Q_a$ value generally corresponds to the average of the individual CQS values for each of the fifteen color samples. In the $Q_a$ value, lamps are not penalized for increasing object chroma relative to the reference source. The net result is that a lamp's score is only penalized for hue shifts, lightness shifts, and reductions in chroma. Calculation of the $Q_a$ value is more fully described in W. Davis and Y. Ohno, "Toward an improved color rendering metric," Proc. SPIE Fifth International Conference on Solid State Lighting, 5941, 2005, the entire contents of which are hereby incorporated by reference. Calculations of $Q_a$ for a given light source are readily achievable by a person of skill in the art. Several different versions of the CQS system have now been published by NIST, but in the present disclosure, all reference to the CQS system refers to its version 7.5.

As set by NIST, the CQS utilizes a standard set of fifteen saturated Munsell color samples (sometimes referred to as color "chips"), having the hue value and chroma shown in Table I.

TABLE I

| Label for Color sample of the CQS | Hue value | Chroma |
|---|---|---|
| VS1 | 7.5 P 4 | 10 |
| VS2 | 10 PB 4 | 10 |
| VS3 | 5 PB 4 | 12 |
| VS4 | 7.5 B 5 | 10 |
| VS5 | 10 BG 6 | 8 |
| VS6 | 2.5 BG 6 | 10 |
| VS7 | 2.5 G 6 | 12 |
| VS8 | 7.5 GY 7 | 10 |
| VS9 | 2.5 GY 8 | 10 |
| VS10 | 5 Y 8.5 | 12 |
| VS11 | 10 YR 7 | 12 |
| VS12 | 5 YR 7 | 12 |
| VS13 | 10 R 6 | 12 |
| VS14 | 5 R 4 | 14 |
| VS15 | 7.5 RP 4 | 12 |

VS1 corresponds to the first standard Munsell color sample, VS2 corresponds to the second Munsell color sample, and so on. The hue labels have the following descriptions: "P" is purple, "PB" is purple-blue, "B" is blue, "BG" is blue-green, "G" is green, "GY" is green-yellow, "Y" is yellow, "YR" is yellow-red, "R" is red and "RP" is red-purple.

As discussed by Davis and Ohno (article titled "Color quality scale", published in Optical Engineering, 49(3), 033602, March 2010), and thus as would be understood in general by persons having ordinary skill in the art, there also exists a Color Preference Scale, which is a variant of the Color Quality Scale. Although the General CQS $Q_a$ parameter has been designed to indicate the overall color quality of a light source, the Color Preference Scale (with a characteristic parameter $Q_p$) places additional weight on preference of object color appearance. This metric $Q_p$ is based on the notion that increases in chroma are generally preferred and should be rewarded. $Q_p$ is calculated similarly to the procedures for the CQS $Q_a$, except that it rewards light sources for increasing object chroma. The calculation is discussed in the Davis and Ohno article noted above, and thus $Q_p$ would be understood in general by persons having ordinary skill in the art. The CQS system and the $Q_a$ value were developed so as not to penalize chroma increase. But, the $Q_p$ value not only does not penalize chroma increase, it positively gives a benefit to the chroma increase.

Note that, as used in this disclosure, "Color Preference" and "Color Preference Scale" are different in meaning from similar terms which may have been utilized in article entitled "A Validation of the Color-Preference Index" by W. A. Thornton, published by Journal of the Illuminating Engineering Society, pages 48-52 (October 1974).

There also exists a third parameter employed in embodiments of this disclosure: Gamut Area Scale, $Q_g$. Despite the regard given to color saturation in the design of the CQS, the $Q_a$ metric is unable to completely distinguish between light sources that have different abilities in saturating object colors. For instance, a source that renders the color of given color sample with increased chroma ($\Delta C>0$), can have the same $Q_a$ score as another source that renders the color of the same sample without increased chroma ($\Delta C=0$). This drawback of the $Q_a$ metric can be mitigated by the supplementing the CQS score by a gamut-area-based figure of merit. Thus, NIST has developed the Gamut Area Scale, $Q_g$. It is defined as: the relative gamut area formed by the polygon defined by the coordinates of the 15 CQS test color samples in the a*-b* plane of the CIELAB object color space. Values for $Q_g$ can be larger than 100. The Gamut Area Scale has already been discussed by Davis and Ohno (article titled "Color quality scale", published in Optical Engineering, 49(3), 033602, March 2010), and by Zukauskas, et al. (ZUKAUSKAS, VAICEKAUSKAS and SHUR, Colour-rendition properties of solid-state lamps, Journal of Physics D: Appl. Phys., published 19 Aug. 2010, volume 43, page 354006), and thus would be understood in general by persons having ordinary skill in the art. Consequently, the calculation for $Q_g$ would be understood in general by persons having ordinary skill in the art.

Thus, these parameters for characterizing color $Q_a$, $Q_p$ and $Q_g$ are advantageously employed in accordance with the present invention. As previously noted, one embodiment of the present invention is directed to a low pressure discharge lamp having evenly enhanced chroma and improved color preference. The lamp, when energized, has a total light emission exhibiting a correlated color temperature (CCT) of between about 2000 kelvin to about 4500 kelvin. The lamp comprises, a light-transmissive envelope, a fill gas sealed inside the envelope, and a phosphor composition having a light emission when energized. When the lamp is energized the lamp has a total light emission which: (a) has a color point below the Planckian locus in the CIE standard chromaticity diagram; (b) exhibits delta chroma values for each of VS1 through VS15 of from about −10.0 to about +12.5, the delta chroma values measured in the CIE LAB space; and (c) exhibits a Color Preference Scale $Q_p$ value of at least about 88.

The color appearance of the combined light output of a lamp can be described by its chromaticity coordinates, which, as would be understood by those skilled in the art, can be calculated from the spectral power distribution according to standard methods. This is specified according to CIE, Method of measuring and specifying color rendering properties of light sources (2nd ed.), Publ. CIE No. 13.2 (TC-3, 2), Bureau Central de la CIE, Paris, 1974. (CIE is the International Commission on Illumination or Commission Internationale d'Eclairage). In certain embodiments, the lamps may have a color point which is simultaneously below the Planckian locus in the CIE chromaticity diagram at the CCT of the lamp, and the color point is within an area on a 1931 CIE Chromaticity Diagram defined by a quadrangle having four vertices with the following x,y coordinates:
(0.394, 0.385)
(0.394, 0.360)
(0.470, 0.410)
(0.454, 0.370).

The total light emission is characterized such that it has pre-selected delta chroma (Δ-chroma) values falling within certain parameters for each of the color samples (VS1 through VS15) utilized in the Color Quality Scale (CQS). As the term is used herein, "chroma" values are measured in the CIE LAB space. For example, the CIE 1976 a,b chroma value is calculated as $C^*_{ab}=[(a^*)^2+(b^*)^2]^{1/2}$, as would be well known to those skilled in the art, and as may be found in standard handbooks in the field such as Illuminating Engineering Society of North America Lighting Handbook (ISBN-10: 0-87995-150-8). According to embodiments of the present invention, the CQS is used in the following manner. A lamp (or other light source) generates light having chroma values for each color chip, at a given correlated color temperature (CCT) and at a given color point (or chromaticity coordinates) for the light. These chroma values are then compared with a reference set of chroma values for each color chip generated using a reference source. That reference source is Planckian blackbody radiation having both essentially the same color temperature as the light source under study. The delta chroma (Δ-chroma) value for each color chip under illumination by the lamp or light source under study, is the arithmetic difference between the chroma value of lamp or light source, and the reference source chroma value.

Stated with more specificity, lamps in accordance with embodiments of the invention may have total light emission exhibiting delta chroma values for each of VS1 through VS15 as follows:

| CQS color chip | Minimum Delta Chroma | Maximum Delta Chroma |
|---|---|---|
| VS1 | −5.5 | −0.5 |
| VS2 | −1.5 | 5.5 |
| VS3 | −3.0 | −1.0 |
| VS4 | −4.0 | 2.5 |
| VS5 | −4.0 | 4.5 |
| VS6 | −1.0 | 6.5 |
| VS7 | 2.0 | 6.0 |
| VS8 | −1.0 | 7.5 |
| VS9 | −1.0 | 11.0 |
| VS10 | 0.0 | 12.5 |
| VS11 | 0.5 | 6.5 |
| VS12 | 1.0 | 5.0 |
| VS13 | 2.5 | 5.5 |
| VS14 | −8.5 | −3.0 |
| VS15 | −10.0 | −4.5 | wherein delta chroma values are measured in the CIE LAB space.

In accordance with further embodiments of the disclosure, lamps may have total light emission which exhibits a Color Preference Scale c value typically from about 88 to about 95; General Color Quality Scale $Q_a$ value generally in the range of at least about 81 (possibly from about 81 to about 90); and Gamut Area Scale $Q_g$ value typically of at from about 97 to about 105. As noted, the enhanced chroma values of the lamps described above may be attained while simultaneously exhibiting a total light emission with $R_a$ value of at least about 77, more preferably at least about 80, e.g., from about 81 to about 86.

Certain embodiments of the invention achieve the favorable color values above by judicious use of phosphor compositions. A suitable phosphor composition may comprise a first red phosphor having a peak emission in the range of from about 590 to about 630 nm; a green phosphor having a peak emission in the range of from about 500 to about 570 nm; a blue phosphor having a peak emission in the range of from about 450 to about 500 nm; and optionally a second red phosphor the second red phosphor having a peak emission in the range of from about 590 to about 670 nm; taking note of the fact that each phosphor in the composition may emit one or more colors. In accordance with embodiments of this disclosure, a narrowband phosphor may usually have a halfwidth of no more than about 30 nm. In many cases it is less than about 15 nm or less than about 10 nm. In accordance with embodiments of this disclosure, a broadband phosphor usually has a halfwidth of more than about 30 nm. In many cases it is more than about 50 nm.

Suitable first red phosphors may have a narrowband peak emission, with a peak emission half-value width which may be generally of from about 1 to about 30 nm. Some suitable first red phosphors may have a peak emission in the range of from about 600 to about 620 nm. In some specific embodiments, the first red phosphor may have a peak emission at about 611 nm and a half-value width of about 2 nm. Concretely, one suitable first red phosphor may comprise an europium-doped yttrium oxide, often where the europium is trivalent. A possible formula for the europium-doped yttrium oxide phosphor may be generally $(Y_{(1-x)}Eu_x)_2O_3$, where $0<x<0.1$, possibly, $0.02<x<0.07$, for example, $x=0.06$. Such europium-doped yttrium oxide phosphors are often abbreviated YEO (or sometimes YOX or YOE). Other possible first red phosphors may include $3.5MgO*0.5MgF_2*GeO_2:Mn^{4+}$ (MfG) or and yttrium vanadate-phosphate $((Y(V,P)O_4:Eu)$ or the like; and may include combinations of the foregoing with each other or with YEO or with other phosphors. Generally, the first red phosphor may be present in the phosphor composition in an amount typically between about 48 wt % to about 75% wt %.

Suitable green phosphors may exhibit a narrowband peak emission, with a peak emission half-value width which may be generally from about 1 to about 30 nm. Some suitable green phosphors may have a peak emission in the range of from about 520 nm to about 560 nm, or in the range of from about 535 nm to about 555 nm. One particular suitable phosphor is considered to have a peak emission of about 544 nm and a half-value width of about 5 nm. Often, the green phosphor may be a cerium- and terbium-doped phosphor, such as a cerium- and terbium-doped lanthanum phosphate. Typical formulae for cerium- and terbium-doped lanthanum phosphate may include one selected from $LaPO_4$:La,Tb; $LaPO_4$:$La^{3+},Tb^{3+}$; or $(La,Ce,Tb)PO_4$. Specific cerium- and terbium-doped lanthanum phosphate phosphors in accordance with embodiments of the invention may have the formula $(La_{(1-x-y)}Ce_xTb_y)PO_4$, where $0.1<x<0.6$ and $0<y<0.25$ (or possibly, $0.2<x<0.4$; $0.1<y<0.2$) (LAP). Other possible green phosphors may comprise one or more of $(Ba,Sr,Ca)MgAl_{10}O_{17}:Eu^{2+},Mn^{2+}$ (BAMn); $ZnSiO_4$:Mn; $(Ce,Tb)MgAl_{11}O_{19}$ (CAT); and $(Ce,Tb)(Mg,Mn)Al_{11}O_{19}$. Generally, the green phosphor may be present in the phosphor composition in an amount typically between about 12 wt % to about 24% wt %.

Suitable blue phosphors may have a broadband peak emission, with a peak emission half-value width which may be generally from about 30 to about 100 nm. In embodiments, some suitable blue phosphors may have a peak emission in the range of from about 480 nm to about 500 nm, for example, a peak emission of about 490 nm to about 495 nm and a half-value width of from about 55 to about 75 nm. In certain embodiments, the blue phosphor may comprise a europium-doped strontium aluminate. Such europium-doped strontium aluminate may have the formula of $Sr_4Al_{14}O_{25}:Eu^{2+}$ (SAE). In such formula, the europium-doped strontium aluminate phosphor may comprise Sr and Eu in the following atom ratio: $Sr_{0.90-0.99}Eu_{0.01-0.1}$. Generally, the blue phosphor is present in the phosphor composition in an amount typically between about 5 wt % to about 30 wt %, and more narrowly, between about 10 wt % to about 30 wt %. Other possible blue phosphors may comprise one or more of $(Ba,Sr,Ca)MgAl_{10}O_{17}:Eu^{2+}$ (BAM); $(Sr,Ba,Ca)_5(PO_4)_3Cl:Eu$; $Y_3Al_5O_{12}$:Ce; $Ca_{10}(PO_4)_6FCl:Sb,Mn$; or $Sr_6BP_5O_{20}:Eu^{2+}$; or the like.

The optional second red phosphor may have a broadband peak emission, typically with a peak emission half-value width which may be generally from about 30 to about 100 nm. In some embodiments, the second red phosphor may exhibit a peak emission in the range of from about 600 to about 660 nm, e.g., peak emission of about 630 nm with a half-value width of from about 75 to about 80 nm. In embodiments, the second red phosphor may comprise a metal pentaborate doped with at least one of cerium and manganese. Such a metal pentaborate doped with at least one of cerium and manganese can have formula $(Gd(Zn,Mg)B_5O_{10}:Ce^{3+},Mn^{2+}$ (CBM). Typically, the second red phosphor may be present in the phosphor composition in an amount of from 0 wt % to about 20 wt %. Other possible second red phosphor may comprise $(Sr, Mg)_3(PO_4)_2:Sn$ (strontium red).

While examples are presented herein utilizing certain phosphors, one of skill can build or adapt a lamp having the same CQS color rendering properties, by ascertaining the spectral patterns of the lamps made in accordance with these examples. One would choose other phosphors which match the spectra of the phosphors in the inventive blends described in the examples.

Referring now to FIG. 1, herein is shown an exemplary embodiment of a linear low-pressure vapor discharge fluorescent lamp 1. It will be appreciated that a variety of fluorescent lamps may be used with the present invention, including single or double ended lamps, curved or straight lamps, and electrodeless lamps. Such lamp may contain mercury vapor as a fill, or may be mercury-free, but will (in this exemplary embodiment) contain a vapor (or fill) that supports a discharge. The fluorescent lamp 1 has a light-transmissive tube or envelope 6 formed from glass or other suitable material, which may have a circular cross-section. At least an inner surface (not specifically shown) of the glass envelope 6 is provided with a phosphor-containing layer 7. The lamp is typically hermetically sealed by bases 2, attached at ends of the tube, respectively. Usually two spaced electrodes 5 are respectively mounted on the bases 2, and can be supported by stems 4. Often, spaced-apart lead-in wires extend from the one or more stem, and the electrode extending between said lead-in wires may be a coiled metallic filament comprising an emissive composition. The electrodes 5 are typically provided with current by pins 3 which are received in an electric socket. A discharge-sustaining fill 8, which may be formed from mercury and an inert gas, is sealed inside the glass tube.

The inert gas may be typically argon or a mixture of argon and other noble gases at low pressure, which, in combination with a small quantity of mercury, provide the low vapor pressure manner of operation. The fill may comprise an inert gas comprising one or more of Ar and Kr, e.g., about 15% to 85% Kr and about 85% to 15% Ar. The fill pressure may be from about 1 to about 5 mBar, possible from about 2 to about 3 mBar. Individual phosphor material amounts used in the phosphor composition of the phosphor layer 7 will vary depending upon the desired color spectra and/or color temperature. The relative amount of a phosphor material can be described by its spectral weight. That is, the spectral weight is the amount each phosphor material supplies to the overall emission spectra. It is to be understood that one of ordinary skill in the art would appreciate that other phosphor compounds having similar emission spectra may be used in the phosphor compositions described herein. The weight percent of each phosphor composing the phosphor layer 7 may vary depending on the characteristics of the desired light output.

In an alternative embodiment, the lamp of the present disclosure can be a compact fluorescent lamp (CFL) having a folded or wrapped topology so that the overall length of the lamp is much shorter than the unfolded length of the glass tube (not specifically depicted). The varied modes of manufacture of and configurations for linear as well as compact fluorescent lamps are generally known to persons skilled in the field of low pressure discharge lamps.

The present low-pressure discharge lamps generally provide a color solution for achieving enhanced chroma, while still maintaining an acceptably high color rendering index. Furthermore, a generally high efficacy (in lumens per watt, LPW) is also simultaneously attained. In certain embodiments, the lamp attains an LPW value of from about 56 to 84 (often, it is from about 71 Ipw to about 84 Ipw for LFL and from about 56 Ipw to about 64 for CFL).

When viewed in "VS space" (in accordance with the Color Quality System), a balanced increase in chroma may be achieved. Lamps having the disclosed values of color preference $Q_p$ with enhanced gamut $(Q_g)$ may be considered as appropriate for general lighting applications and expected to be preferred, since the visual clarity and perceived brightness of an illuminated scene will be increased. Such lamps may be especially beneficial for applications where color, colorfulness, color discrimination capability and visual clarity/visual acuity are important, such as at schools, work places, retail markets, museums and the like.

In order to promote a further understanding of the invention, the following examples are provided. These examples are illustrative, and should not be construed to be any sort of limitation on the scope of the claimed invention.

EXAMPLES

Example 1 (Comparative Example)

A typical triband (triphosphor) linear T8, 18 W fluorescent lamp was assembled for comparative purposes, using an 827 design vehicle. Efficacy was 88 Ipw. The phosphor layer was composed of YEO at 60 wt %, LAP at 35 wt %, and BAM at 5 wt %. It exhibited CCT of 2726 kelvin, a color point above the Planckian locus (at about (0.465,0.425)), and a value of Ra of 83. However, its rendering of saturated red was relatively poor ($R_9=-13$), and its CQS values were as follows: $Q_a=77$; $Q_p=80$; and $Q_g=92$.

Example 2 (Comparative Example)

Figure 5:
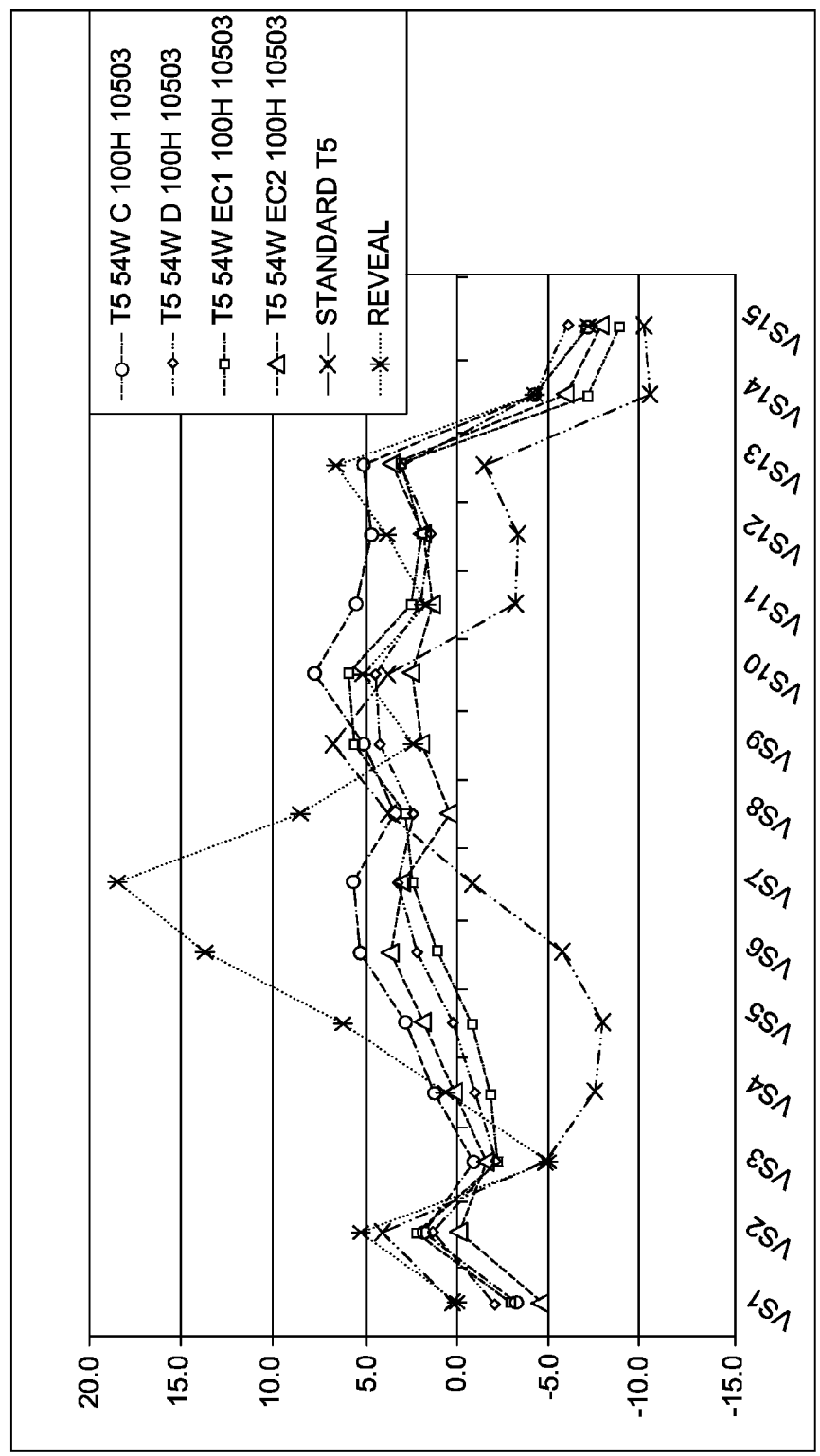
FIG. 5 is a graph of delta chroma (VS) values exhibited by four lamps according to embodiments of the present disclosure, which are the same lamps as those characterized in FIG. 4.

The same typical triband phosphor composition as in Example 1 was employed in a T5, 54 W configuration to assemble another standard linear fluorescent lamp. The fill used was 100% Ar at 4.5 mbar, giving 85 Ipw efficacy. This lamp exhibited a color temperature of 2813 kelvin and Ra=81. It also rendered saturated red rather poorly ($R_9=-16$) and its CQS values were as follows: $Q_a=76$; $Q_p=79$; $Q_g=93$. FIG. 5 depicts its variations in delta chroma (VS) for fifteen color chips; see the blue curve which used "X" marks. The chroma is not considered to be enhanced in a relatively even fashion; there were relatively large excursions in VS value (e.g., for the VS5 color chip, delta chroma was about −8 while for VS9 it was about +6, a 14-point excursion).

Example 3

Several T5 lamps according to embodiments of the disclosure were prepared according to an 830 design vehicle and evaluated.

3(a). The first such lamp, denoted "EC1", was a T5, 54 W lamp, which employed a phosphor composition of YEO (6% Eu) at 65.4 wt %, LAP (high Tb) at 22.6 wt %, and SAE at 12 wt %. Discharge fill was 15% Kr, 85% Ar at 3 mbar, giving efficacy 84 Ipw. Lamp EC1 exhibited color temperature around 2800 K, and further exhibited Ra=85, $R_9=5$, $Q_a=87$ and $Q_p=89$, demonstrating excellent color preference value. Chromaticity is shown graphically in FIG. 4 and VS values graphed in FIG. 5.

Figure 4:
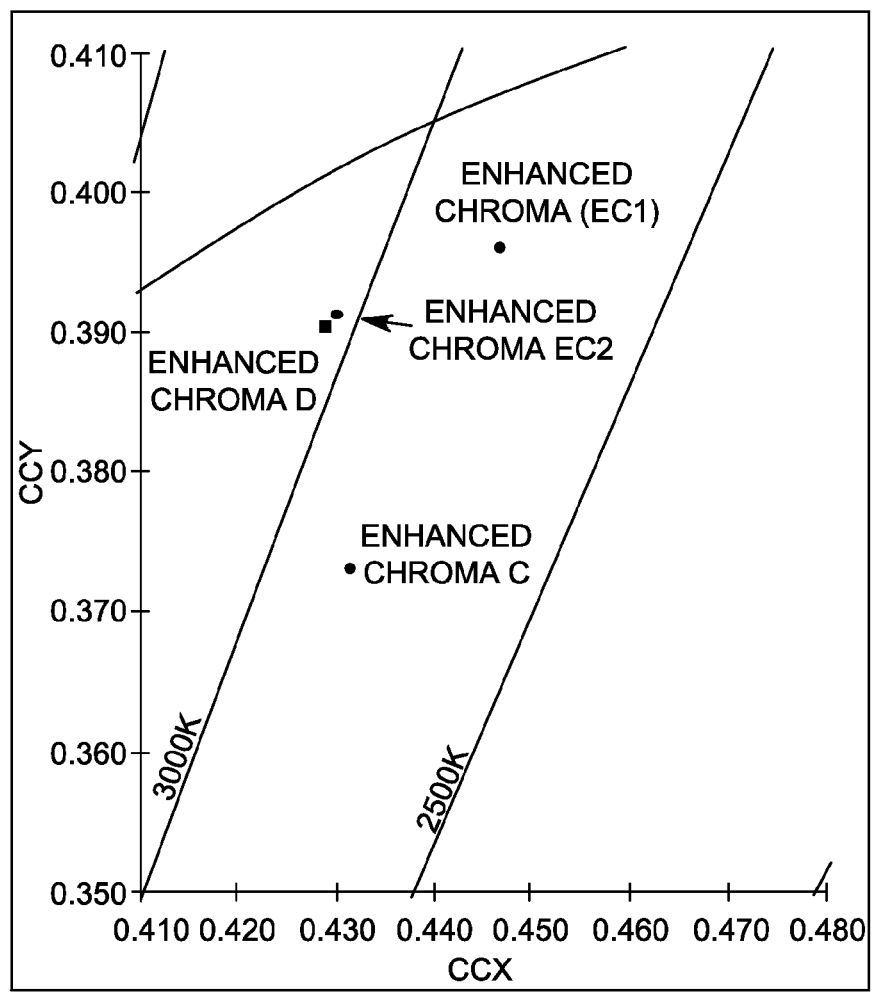
FIG. 4 illustrates the color points (chromaticities) exhibited by four lamps according to embodiments of the present disclosure, all in a T5 linear fluorescent design vehicle.

3(b). The next lamp, denoted "EC2", was a T5, 54 W linear fluorescent lamp employing the following phosphor composition: YEO at 60 wt %, LAP at 20 wt %, and SAE at 20 wt %, using a fill of 85% Ar/15% Kr at 3 mbar. The lamp exhibited CCT around 3000 K. The color point is shown in FIG. 4, and VS values in FIG. 5.

3(c). Another exemplary T5 54 W LFL (denoted "C") employed the following phosphor composition: YEO at 58 wt %; LAP at 13 wt %; SAE at 20 wt %, and CBM at 9 wt %. A 3 mbar fill of 85% Ar, 15% Kr was employed. CCT was about 2750, the color point is shown in FIG. 4, and VS values are shown in FIG. 5.

3(d). Another exemplary T5 54 W LFL (denoted "D") employed the following phosphor composition: YEO 49 wt %, LAP 18 wt %, SAE 16 wt %, CBM 16 wt %. A fill of 3 mbar of 85% Ar, 15% Kr was used. CCT was about 3050 K. Color point is shown in FIG. 4, and VS values are shown in FIG. 5.

All of these T5 lamps in Examples 3(a)-(d) exhibited acceptable efficacy (LPW 71-84) and favorable color properties in the following ranges: Ra of 79-86; $R_9$ of 5-38; $Q_a$ of 85-89; $Q_p$ of 89-95; and $Q_g$ of 99-105.

Example 4 (Comparative Example)

Figure 3:
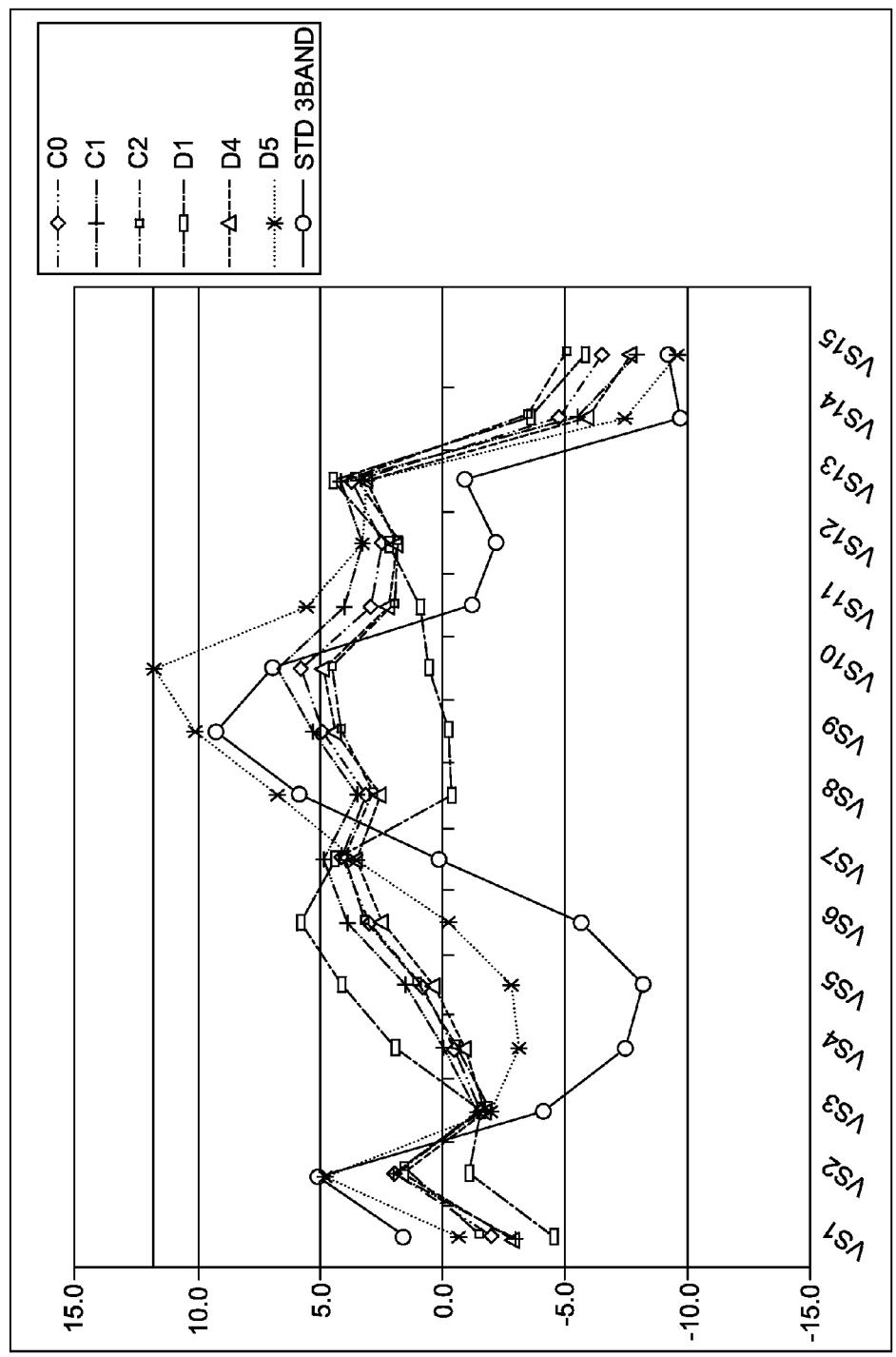
FIG. 3 is a graph of delta chroma (VS) values exhibited by six lamps according to embodiments of the present disclosure, all in a 20 W spiral CFL design vehicle. These six lamps are a subset of those characterized in FIG. 2.

A typical triband (triphosphor) spiral 20 W CFL was assembled for comparative purposes. VS values are shown in FIG. 3 on the curve which uses purple circles. This lamp exhibited Ra=80; $R_9$=−7; $Q_a$=75; $Q_p$=80; and $Q_g$=97.

Example 5

Exemplary 20 W spiral CFL lamps according to embodiments of the disclosure were assembled.

Figure 2:
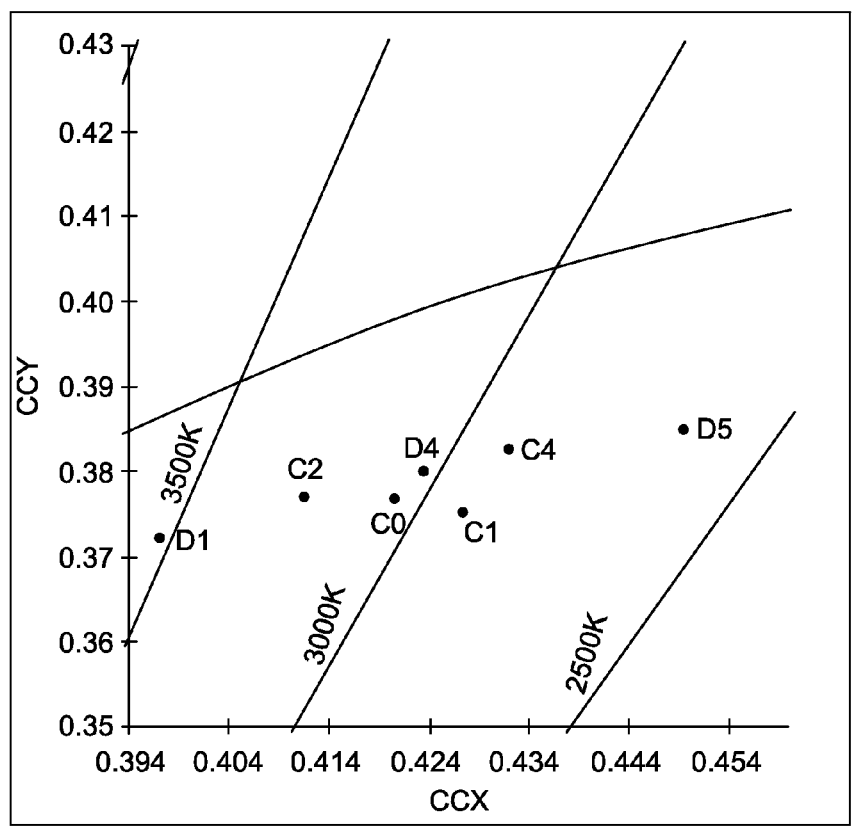
FIG. 2 illustrates the color points (chromaticities) exhibited by seven lamps according to embodiments of the present disclosure, all in a 20 W spiral CFL design vehicle.

5(a). The following phosphor composition was employed for assembly of a spiral 20 W CFL lamp, and denoted "D5": 73 wt % YEO; 17 wt % LAP; and 10 wt % SAE. This lamp exhibited a color temperature of approximately 2700 K and chromaticity near the point (0.450, 0.385). Chromaticity for lamp D5 are shown in FIG. 2 and its VS values graphed in FIG. 3.

5(b). Another similar spiral 20 W CFL lamp, denoted "D4", was prepared employing the following phosphor composition: 65 wt % YEO, 15 wt % LAP, and 20 wt % SAE. CCT was approximately 3050K, and color point was near (0.424, 0.380). Chromaticity for lamp D4 are shown in FIG. 2 and its VS values graphed in FIG. 3.

5(c). Five additional CFL lamps in accordance with embodiments of the invention were assembled, and denoted "C0", "C1", "C2", "C4" and "D1". These five lamps and those described in Examples 5(a)-5(b) above exhibited good efficacy (LPW 56-64) and favorable color properties in the following ranges: Ra of 81-86; $Q_a$ of 81-90; $Q_p$ of 90-95; and $Q_g$ of 101-105.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable.

As used herein, the phrases "adapted to," "configured to," and the like refer to elements that are sized, arranged or manufactured to form a specified structure or to achieve a specified result. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. It is also anticipated that advances in science and technology will make equivalents and substitutions possible that are not now contemplated by reason of the imprecision of language and these variations should also be construed where possible to be covered by the appended claims.

What is claimed as new and desired to be protected by Letters Patent of the United States is:

1. A low pressure discharge lamp having evenly enhanced chroma and improved color preference, which lamp when energized has a total light emission exhibiting a correlated color temperature (CCT) of between about 2000 kelvin to about 4500 kelvin, the lamp comprising:
   a light-transmissive envelope,
   a fill gas sealed inside said envelope, and
   a phosphor composition having a light emission when energized; and
   wherein when said lamp is energized said lamp has a total light emission which:
   (a) has a color point below the Planckian locus in the CIE standard chromaticity diagram;
   (b) exhibits delta chroma values for each of VS1 through VS15 of from about −10.0 to about +12.5, the delta chroma values measured in the CIE LAB space; and
   (c) exhibits a Color Preference Scale $Q_p$ value of at least about 88.

2. The lamp in accordance with claim 1, wherein the total light emission exhibits a General Color Quality Scale $Q_a$ value of at least about 81.

3. The lamp in accordance with claim 1, wherein the total light emission exhibits $R_a$ value of at least about 77.

4. The lamp in accordance with claim 1, wherein the total light emission has a color point which is simultaneously below the Planckian locus in the CIE chromaticity diagram at the CCT of the lamp, and the color point is within an area on a 1931 CIE Chromaticity Diagram defined by a quadrangle having four vertices with the following x,y coordinates:
   (0.394, 0.385)
   (0.394, 0.360)
   (0.470, 0.410)
   (0.454, 0.370).

5. The lamp in accordance with claim 1, wherein the total light emission exhibits delta chroma values for each of VS1 through VS15 as follows:

| CQS color chip | Minimum Delta Chroma | Maximum Delta Chroma |
| --- | --- | --- |
| VS1 | −5.5 | −0.5 |
| VS2 | −1.5 | 5.5 |
| VS3 | −3.0 | −1.0 |
| VS4 | −4.0 | 2.5 |
| VS5 | −4.0 | 4.5 |
| VS6 | −1.0 | 6.5 |
| VS7 | 2.0 | 6.0 |
| VS8 | −1.0 | 7.5 |
| VS9 | −1.0 | 11.0 |
| VS10 | 0.0 | 12.5 |
| VS11 | 0.5 | 6.5 |
| VS12 | 1.0 | 5.0 |
| VS13 | 2.5 | 5.5 |
| VS14 | −8.5 | −3.0 |
| VS15 | −10.0 | −4.5 | wherein delta chroma values are measured in the CIE LAB space.

6. The lamp in accordance with claim 1, wherein the total light emission exhibits a Gamut Area Scale $Q_g$ value of at from about 97 to about 105.

7. The lamp in accordance with claim 1, wherein said phosphor composition comprises:
a first red phosphor having a peak emission in the range of from about 590 to about 630 nm;
a green phosphor having a peak emission in the range of from about 500 to about 570 nm;
a blue phosphor having a peak emission in the range of from about 450 to about 500 nm;
and optionally a second red phosphor the second red phosphor having a peak emission in the range of from about 590 to about 670 nm;
wherein each phosphor in the composition may emit one or more colors.

8. The lamp in accordance with claim 7, wherein the first red phosphor is selected from the group consisting of europium-doped yttrium oxide; $3.5MgO*0.5MgF_2*GeO_2:Mn^{4+}$ (MfG); yttrium vanadate-phosphate ($(Y(V,P)O_4:Eu)$); and combinations thereof.

9. The lamp in accordance with claim 8, wherein the first red phosphor comprises a europium-doped yttrium oxide.

10. The lamp in accordance with claim 7, wherein the first red phosphor is present in the composition in an amount between about 48 wt % to about 75% wt %.

11. The lamp in accordance with claim 7, wherein the green phosphor is selected from the group consisting of: cerium- and terbium-doped lanthanum phosphate; $(Ba,Sr,Ca)MgAl_{10}O_{17}:Eu^{2+},Mn^{2+}$ (BAMn); $ZnSiO_4:Mn$; $(Ce,Tb)MgAl_{11}O_{19}$ (CAT); $(Ce,Tb)(Mg,Mn)Al_{11}O_{19}$; and combinations thereof.

12. The lamp in accordance with claim 11, wherein the green phosphor comprises a cerium- and terbium-doped lanthanum phosphate.

13. The lamp in accordance with claim 7, wherein said green phosphor is present in the composition in an amount between about 12 wt % to about 24 wt %.

14. The lamp in accordance with claim 7, wherein said blue phosphor is selected from the group consisting of europium-doped strontium aluminate; $(Ba,Sr,Ca)MgAl_{10}O_{17}:Eu^{2+}$ (BAM); $(Sr,Ba,Ca)_5(PO_4)_3Cl:Eu$; $Y_3Al_5O_{12}:Ce$; $Ca_{10}(PO_4)_6FCl:Sb,Mn$; $Sr_6BP_5O_{20}:Eu^{2+}$; and combinations thereof.

15. The lamp in accordance with claim 14, wherein said blue phosphor comprises a europium-doped strontium aluminate.

16. The lamp in accordance with claim 7, wherein the blue phosphor is present in the composition in an amount between about 5 wt % to about 30 wt %.

17. The lamp in accordance with claim 7, wherein the second red phosphor comprises one or more of: a metal pentaborate doped with at least one of cerium and manganese; and $(Sr, Mg)_3(PO_4)_2:Sn$ (strontium red); wherein the second red phosphor is present in the composition in an amount of from 0 wt % to about 20 wt %.

18. A low pressure discharge lamp having evenly enhanced chroma and improved color preference, which lamp when energized has a total light emission exhibiting a correlated color temperature of between about 2000 kelvin to about 4500 kelvin, the lamp comprising:
a light-transmissive envelope,
a fill gas sealed inside said envelope, and
a phosphor composition having a light emission when energized; and
wherein when said lamp is energized said lamp has a total light emission which:
(a) exhibits delta chroma values for each of VS1 through VS15 of from about −10.0 to about +12.5, the delta chroma values measured in the CIE LAB space; and
(b) exhibits a Color Preference Scale $Q_p$ value of at least about 88;
wherein said phosphor composition comprises:
a first red phosphor having a peak emission in the range of from about 590 to about 630 nm and a half-value width of from about 1 to about 30 nm, and optionally a second red phosphor having a peak emission in the range of from about 590 to about 670 nm and a half-value width of from about 30 to about 100 nm;
a green phosphor having a peak emission in the range of from about 500 to about 570 nm and a half-value width of from about 1 to about 30 nm; and
a blue phosphor having a peak emission in the range of from about 450 to about 500 nm and a half-value width of from about 30 to about 100 nm; wherein each phosphor in the composition may emit one or more colors.

* * * * *